Feb. 2, 1954

K. F. ZUMKELLER 2,667,703

TOOL SETTING GAUGE

Filed June 28, 1952

INVENTOR,
KARL F. ZUMKELLER,
By Herbert A. Minturn,
ATTORNEY.

Patented Feb. 2, 1954

2,667,703

UNITED STATES PATENT OFFICE 2,667,703

TOOL SETTING GAUGE

Karl F. Zumkeller, Indianapolis, Ind.

Application June 28, 1952, Serial No. 296,121

1 Claim. (Cl. 33—185)

This invention relates to a gage for quickly setting tools for the proper height in relation to the work to be operated upon. It is usable for all lathe tools, such as in turning operations, right hand, left hand, straight, facing, cut off, and in boring operations and also for both internal and external threading.

Heretofore in the machine shop it has taken some little time to set up properly a tool in relation to the work whereby the cutting edge or point of the tool is at the proper elevation in respect to the horizontal plane through the axis of rotation of the work.

In most instances, the cutting edge of the tool is to be set in the horizontal plane through the turning axis of the work. However, for copper, the tool may be set for better working conditions somewhat below the center, and for aluminum and for plastics either above or below depending upon the specific materials being turned. My device is quite adaptable to setting of the tool for these variable conditions, and in doing so without error as to the precise height the cutting is to be in relation to that center of the work.

Further advantages and objects of the invention will become apparent to those versed in the art in the following description of one particular form of the invention as illustrated in the accompanying drawing, in which.

Figure 1:
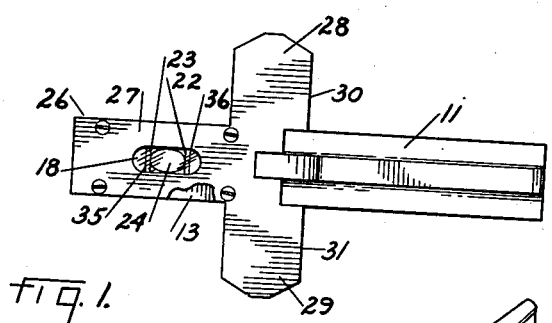
Fig. 1 is a view in top plan of a structure embodying the invention.
Figure 2:
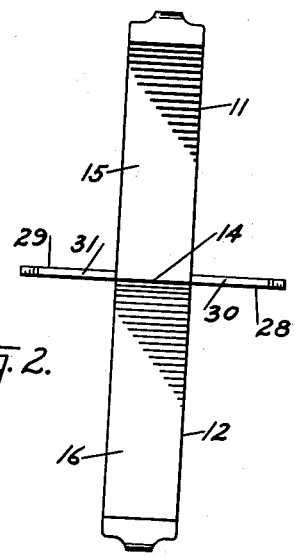
Fig. 2 is a view in "work side" end elevation.

The gage comprises essentially a body 10 from which extend, one at right angles to the other, the upper and lower jaws 11 and 12 respectively. The body 10 has a top face 13 defining a plane which includes the line 14 which is the apex of the angle between the jaws 11 and 12.

That is the body 10 lies below the plane defined by the face 13. Both jaws 11 and 12 are provided with planar faces 15 and 16 each in a plane intersecting with the other on the line 14.

The body 10 is provided with a bore 17 whose axis is parallel with the face 13. Within the bore 17 there is fitted a level tube 18, adjustably fitted therein by means of a resilient packing 19 at the inner end, and resilient packing 20 at the outer end of the tube 18, the packing 20 having pressure exerted thereagainst by means of a closure screw 21 screw-threadedly entered in the outer end portion of the bore 17.

The tube 18 carries a pair of indicating lines 22 and 23 defining the outer end limits of a bubble 24 when the face 13 is exactly horizontally positioned.

The body 10 is provided with a cut away notch 25 thereacross, this notch extending downwardly of the body 10 to open into the bore 17. This notch 25 is located along the body 10 so that the bubble 24 will be approximately centered therein.

A generally T-shaped, tool contact plate 26 is placed on the face 13 and secured rigidly thereover. The plate 26 has a stem portion 27 which is substantially the same width as that of the body 10. The head portion of the plate 26 has the laterally extending wings 28 and 29 which extend a distance laterally from the sides of the body 10, the under faces of these wings 28 and 29 being in the plane of the face 13. The plate 26 is bifurcated between the wings 28 and 29 so as to straddle the base end portion of the jaw 11 in order to bring the forward edges of the wings 28 and 29 to at least coincide by their lower corners with the line 14. The forward edges 30 and 31 of the members 28 and 29 are in a common vertical plane.

Figure 4:
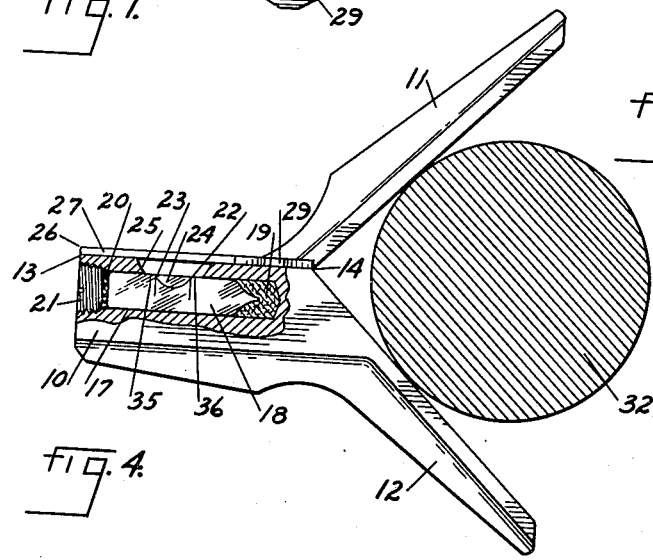
Fig. 4 is a view in side elevation and partial section of the structure as applied to a cylindrical piece of work.
Figure 3:
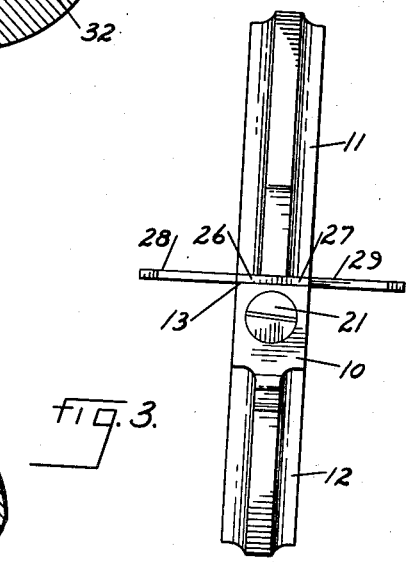
Fig. 3 is a view in outer end elevation.
Figure 5:
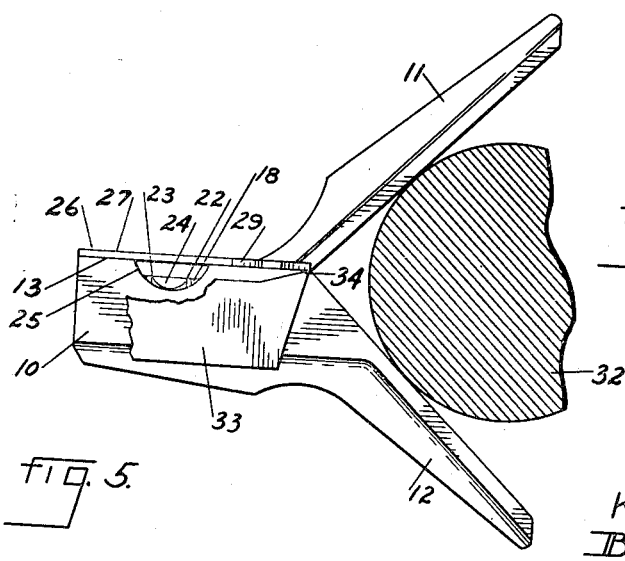
Fig. 5 is a view in side elevation of the device indicating relative positions of the tool and the work.

In using the gage, the jaws 11 and 12 are brought up into tangential contact with a work piece 32, Figs. 4 and 5, and a cutting tool 33 is brought up into close proximity with the work piece 32. The gage is then rocked circumferentially around the work piece 32 until the bubble 24 comes between the lines 22 and 23 to indicate that the face 13 is in a horizontal plane, this plane being continued, intersecting the central axis of the work piece 32. Also, the under sides of the wings 28 and 29 of the plate 26 are likewise in the same plane. The tool 33 is then adjusted vertically to have its cutting edge or point 34 come up into contact with the under side of one of the wings, herein shown as wing 29, while the bubble 24 remains in the horizontal indicating position. This will give a setting of the tool 33 for having its cutting edge or point 34 in the plane horizontally through the axis of the work 32. That is all there is to the setting of the cutting tool.

It is to be noted that in this method of adjusting the cutting tool 33, the cutting edge or point 34 is brought up to within very close proximity with the work piece 32 so that there is the minimum chance of introducing errors in the setting of the elevation of the tool 33 as compared to other devices heretofore employed where the cutting edge or point 34 has to be positioned at a distance much greater from the face of the work piece 32. Additional outer lines 35 and 36 may be provided on the tube 18 to determine limits of the travel of the bubble 24 for any desired positioning of the tool cutting edge or point 34 above or below the horizontal plane.

Thus it is to be seen that I have provided a very simple and yet extremely rapid means in a structure for determining the elevation of a cutting tool in reference to the work upon which it is to operate. While I have herein shown the structure in the one particular form, it is obvious that variations may be made without departing from the spirit of the invention, and I therefore do not desire to be limited to that precise form beyond the limitations which may be imposed by the following claim.

I claim:

A lathe cutting tool gage for tool height setting in reference to the axis of a piece of work, comprising a body; a pair of jaws carried by the body and presenting planar, forward faces ninety degrees apart, the lengths of the jaw faces being sufficient to have their faces tangent to the work piece when presented thereagainst; a tool cutting edge contact member carried by and extending laterally from said body and having an under side planar face starting at least at the line of intersection of the planes of said jaw faces and bisecting the dihedral angle of those jaw faces; a bubble indicating level tube carried by said body having its upper side in close proximity to but below the plane of said member face; the positioning of said bubble along said tube for horizontal placement of said member face being on that side of said member removed from said line of intersection.

KARL F. ZUMKELLER.

References Cited in the file of this patent

UNITED STATES PATENTS

| Number | Name | Date |
|---|---|---|
| 1,224,836 | Blainer | May 1, 1917 |
| 2,472,241 | Wilson | June 7, 1949 |

FOREIGN PATENTS

| Number | Country | Date |
|---|---|---|
| 252,378 | Switzerland | Aug. 16, 1948 |

OTHER REFERENCES

Popular Science, page 84, April 1934.